United States Patent [19]
Yoshifuji

[11] Patent Number: 5,917,426
[45] Date of Patent: Jun. 29, 1999

[54] NETWORK SYSTEM CAPABLE OF MANAGING CONNECTION DATA

[75] Inventor: Yuuki Yoshifuji, Tokyo, Japan

[73] Assignee: NEC Corporation, Tokyo, Japan

[21] Appl. No.: 08/865,857

[22] Filed: May 30, 1997

[30] Foreign Application Priority Data

May 30, 1996 [JP] Japan ................................. 8-136396

[51] Int. Cl.$^6$ ....................................... H04J 3/14
[52] U.S. Cl. ................................ 340/825.8; 340/825.79; 340/826; 340/827; 370/388; 370/360; 370/242; 370/380
[58] Field of Search .......................... 340/825.8, 825.79, 340/826, 827; 370/388, 360, 242, 380

[56] References Cited

U.S. PATENT DOCUMENTS 5,239,537  8/1993  Sakauchi ................................. 340/827

OTHER PUBLICATIONS

*A Study of Non–Blocking Switching Networks*, Charles Clos, Manuscript received Oct. 30, 1952.
Bellcore, "Sonet Add–Drop Multiplex Equipment (Sonet ADM) Generic Criteria, A Module of TSGR, FR–NWT–000440".

Primary Examiner—Brian Zimmerman
Assistant Examiner—Yves Dalencourt
Attorney, Agent, or Firm—Sughrue, Mion, Zinn, Macpeak & Seas, PLLC

[57] ABSTRACT

In a switch network system which has a plurality of network input terminals and a plurality of network output terminals and a plurality of switch matrices between the network input terminals and the network output terminals, network connection data signals which specify paths between the network input terminals and the network output terminals are renewed or regenerated together with interconnection data signals of the switch matrices when any disorder takes place in the network connection data signals and the interconnection data signals. Such regeneration is carried out by retrieving or monitoring actual paths from the network output terminals towards the network input terminals by the use of a route-search and renewal processing unit and switch-search and renewal units. The switch network system may be either a unidirectional network system or a bidirectional network system.

7 Claims, 5 Drawing Sheets

NETWORK SYSTEM CAPABLE OF MANAGING CONNECTION DATA

BACKGROUND OF THE INVENTION

This invention relates to a switch network system which includes a plurality of switch matrices and to a connection data control system which controls or manages connection data signals used for switching each of the switch matrices.

In such a switch network of the type described, each of the switch matrices has input terminals and output terminals, and the matrices are wired to one another. In each of the switch matrices, the input terminals are connected to the output terminals in accordance with connection data signals under control of a main control unit and a main processing unit. In this event, the connection data signals are memorized into a network memory accessed by the main control unit.

Heretofore, a multi-stage switch of a cross type is disclosed as such a switch network system in an article which is described by CHARLES CLOS in Bell System Technical Journal Vol. 32 No. 2 pp. 406–424 and which is titled "Study of Non-Blocking Switching Networks." Alternatively, a network system of a high order group or a ring network system has been also proposed as such a switch network system in Technical Advisory TA-TSY-000496, Issue 3, August 1990,(Bell Communications Research) titled "SONET Add-Drop Multiplex Equipment (SONET ADM) Generic Criteria for a Unidirectional Path Protection Switched, Self-Healing Ring Implementation". Such a ring network system includes a plurality of switch matrices which are arranged as local stations and which are connected through optical transmission paths.

In any event, each switch matrix is switched by the use of the connection data signals to selectively connect the input terminals to the output terminals. In addition, a connection state of each switch matrix and a connection state of the whole of the switch network are monitored on the basis of the connection data signals.

In this switch network system, no consideration is made at all about extinction or breakage of the connection data signals. Accordingly, communication is disrupted at worst because the connection state is released, when such extinction or breakage occurs in the connection data signals.

SUMMARY OF THE INVENTION

It is an object of this invention to provide a switch network system which is capable of coping with extinction or breakage of connection data signals.

It is another object of this invention to provide a switch network system which can regenerate the connection data signals at every one of the switch matrices.

It is still another object of this invention to provide a switch network system of the type described, which can monitor the connection data signals used in the whole of the switch matrices.

According to an aspect of this invention, a method is provided for use in forming a connection path through a switch matrix which has a plurality of input terminals and a plurality of output terminals by the use of interconnection data signals which define the connection path within the switch matrix. The method comprises the steps of connecting a selected one of the input terminals to a selected one of the output terminals through the switch matrix by the use of the connection data signals, monitoring a connection state of the switch matrix, obtaining actual interconnection data signals from the connection state of the switch matrix, and substituting the actual interconnection data signals for the connection data signals when any disorder takes place in connection with the connection data signals.

According to another aspect of this invention, a switch network system comprises controlling means for controlling the switch matrix to connect a selected one of the input terminals to a selected one of the output terminals through the switch matrix by putting the switch matrix into a connection state, monitoring means for monitoring the switch matrix to extract actual interconnection data signals from the connection state, and renewing means for renewing the interconnection data signals into the actual interconnection data signals when any disorder takes place in connection with the interconnection data signals.

According to a further aspect of this invention, a switch network system has a plurality of network input terminals and a plurality of network output terminals and comprises a plurality of switch link stages each of which has a switch matrix and which is successively connected to one another between the plurality of the network input terminals and the plurality of the network output terminals. The switch matrix in each of the switch link stages comprises a plurality of input terminals and a plurality of output terminals. The switch network system comprises main control means for managing network connection data signals which define a connection path between the network input terminals and the network output terminals, sub-control means, which is coupled to said main control means, for producing interconnection data signals in response to said network data signals to control the switch matrix of each switch link stage and to connect a selected one of the input terminals to a selected one of the output terminals through the switch matrix by putting the switch matrix into a connection state, reproducing processing means, which is coupled to said switch matrix of each switch link stage and the sub-control means of each switch link stage, for reproducing the network connection data signals when any disorder takes place in the network connection data signals.

DESCRIPTION OF THE PREFERRED EMBODIMENTS

Figure 1:
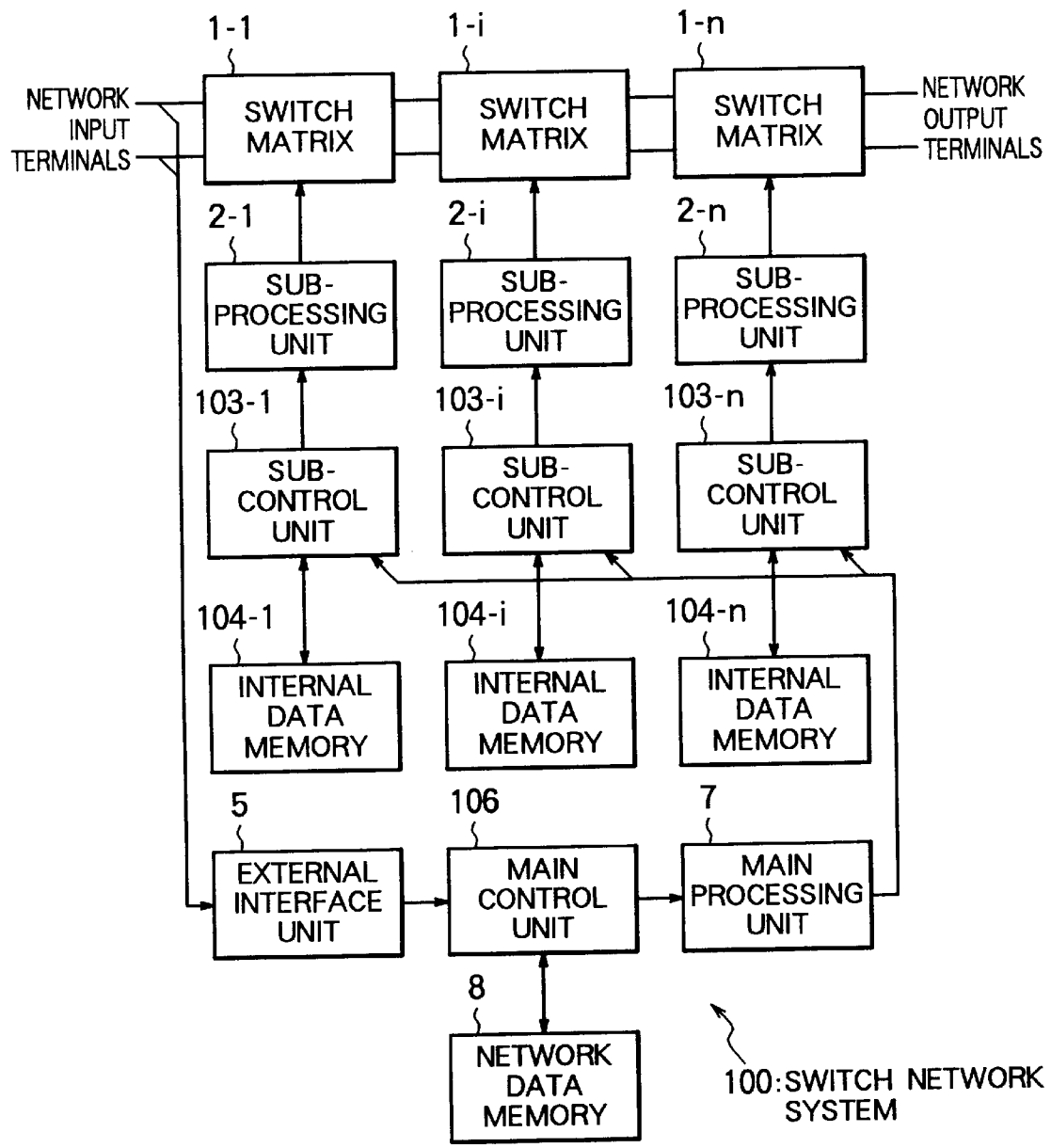
FIG. 1 is a block diagram of a conventional switch network system.

Referring to FIG. 1, description will be directed to a conventional switch network system 100 for a better understanding of this invention. The illustrated switch network system 100 has network input terminals and network output terminals and is formed by first through n-th link stages connected to one another. In the illustrated system, the first through the n-th link stages comprise first through n-th switch matrices 1-1 to 1-n, first through n-th sub-processing units 2-1 to 2-n, first through n-th sub-control units 103-1 to 103-n, and first through n-th internal data memories 104-1 to 104-n, respectively. In addition to the first through the n-th link stages, the switch network system 100 further comprises an external interface unit 5, a main control unit 106, a main processing unit 7, and a network data memory 8, all of which are used in common to the first through the n-th link stages.

It is to be noted here that the internal data memories 104-1 to 104-n store interconnection data signals of the respective switch matrices 1-1 to 1-n to connect each matrix switch to another while the network data memory 8 stores network connection data signals for connection between the network input terminals and the network output terminals. In the illustrated example, it is assumed that the network connection data signals and the internal connection data signals are produced by the main control unit 106 in response to a connection request sent through the external interface unit 5.

In each of the first through the n-th link stages, each of the switch matrices 1-1 to 1-n has input terminals and output terminals, respectively, and is connected to adjacent one or ones of the switch matrices through the input and the output terminals. As shown in FIG. 1, the first through the n-th switch matrices 1-1 to 1-n are connected to and controlled by the sub-processing units 2-1 to 2-n which are controlled by the sub-control units 103-1 to 103-n. Herein, the first through the n-th sub-processing units 2-1 to 2-n process connections between the input and the output terminals of the first through the n-th switch-matrices 1-1 to 1-n, respectively, on the basis of the interconnection data signals which are sent from the sub-control unit 103-1 to 103-n. As a result, the input and the output terminals are determined in each of the first through the n-th switch matrices 1-1 to 1-n under control of each of the first through the n-th sub-processing units 2-1 to 2-n. In addition, the sub-processing units 2-1 to 2-n send the interconnection data signals back to the sub-control units 103-1 to 103-n to be monitored as interconnection management data signals therein, respectively.

The sub-control units 103-1 to 103-n store the interconnection data signals into the internal data memories 104-1 to 104-n as internal management data signals to be managed, respectively. The network connection data signals are stored into the network data memory 8 as network management data signals under control of the main control unit 106.

In reply to a connection request sent through the external interface unit 5 from one of said input terminals, the main control unit 106 decides a selected one of the network input terminals and a selected one of the network output terminals and informs the main processing unit 7 of the decided and selected network input and output terminals.

Supplied with the above-mentioned network input and output terminals, the main processing units 7 decides the switch matrices 1-1 to 1-n located between the selected network input and the selected network output terminal and indicates the sub-control units 104-1 to 104-n used for the connection between the selected network input and the selected network output terminal. The selected input and the selected network output terminal decided by the main processing unit 7 are sent to the main control unit 106 as the network connection data signals which are stored in the network data memory 8 as the network management data signals. The network management data signals are kept in the network data memory 8 and managed by the main control unit 106 until the connection in question is released.

The sub-control units 103-1 to 103-n inform the sub-processing units 2-1 to 2-n of the interconnection data signals sent from the main processing unit 7. Each of the sub-processing units 2-1 to 2-n decides the input and the output terminals of each switch matrix 1-1 to 1-n on the basis of the interconnection data signals. Consequently, the switch matrices 1-1 to 1-n are internally connected under control of the sub-processing units 2-1 to 2-n. On the other hand, the interconnection data signals are sent from the sub-processing units 2-1 to 2-n to the sub-control units 103-1 to 103-n to be stored into the internal data memories 104-1 to 104-n and to be managed as by the sub-control units 103-1 to 103-n.

The network management data signals and the interconnection management data signals which are stored in the network data memory 8 and the the internal data memories 104-1 to 104-n, respectively are backed up in a known manner at a predetermined period and checked and confirmed by the main control unit 106 and the sub-control units 103-1 to 103-n.

In order to carry out such a back-up operation, the network management data signals and the interconnection management data signals may be stored in a couple of memory areas of each memory.

The illustrated switch network system has disadvantages as mentioned in the preamble of the instant specification.

Figure 2:
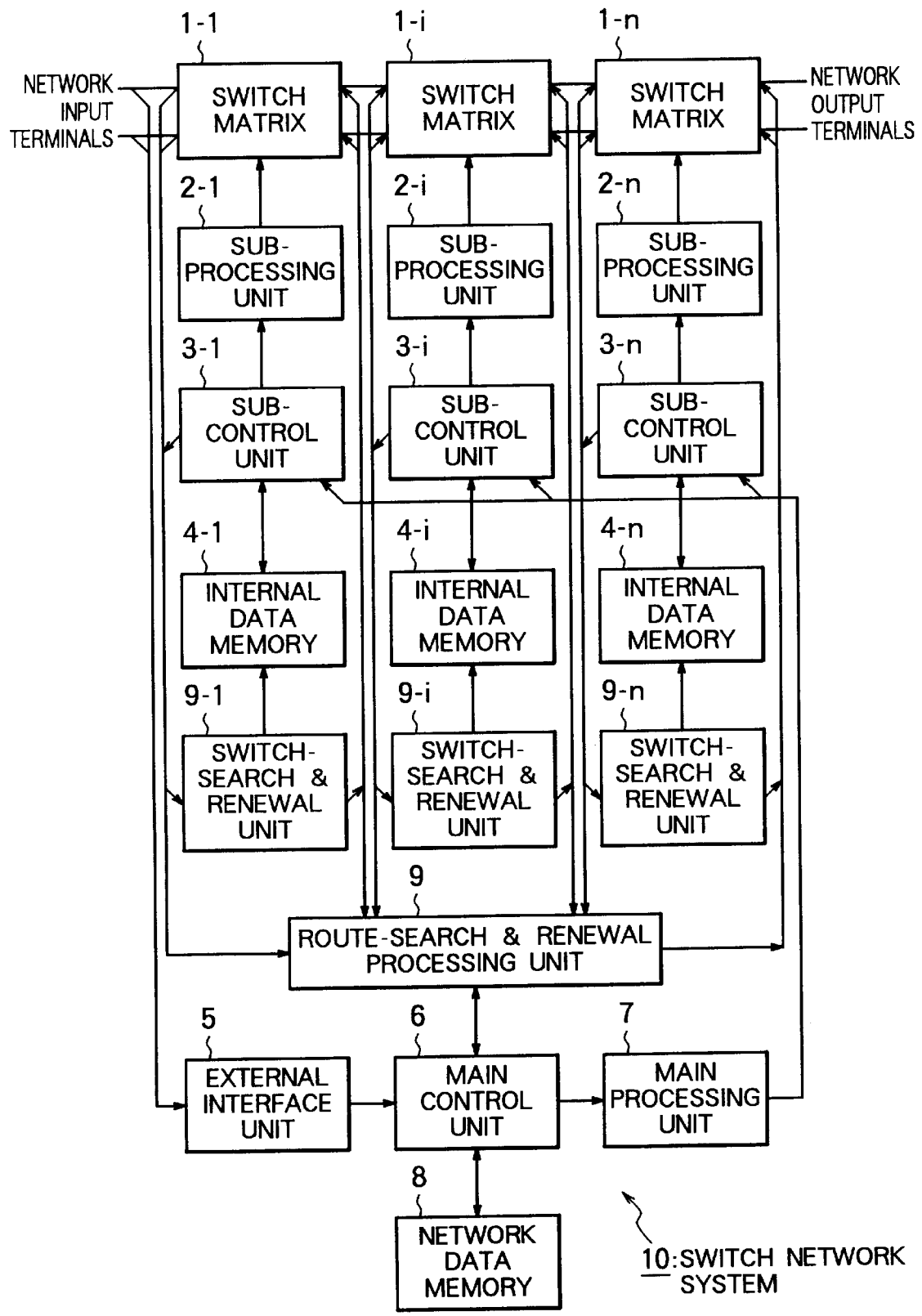
FIG. 2 is a block diagram of a switch network system according to a first embodiment of this invention.

Turning to FIG. 2, a switch network system shown by 10 comprises first through n-th link stages like in FIG. 1. The first through the n-th link stages comprise first through n-th switch matrices 1-1 to 1-n, first through n-th sub-processing units 2-1 to 2-n, first through n-th sub-control units represented by 3-1 to 3-n, and first through n-th internal data memories shown by 4-1 to 4-n. The first through the n-th switch matrices 1-1 to 1-n have input and output terminals while the input terminals of the first switch matrix 1-1 are connected to the network input terminals connected to external transmission lines and the output terminals of the n-th switch matrix 1-n are connected to the network output terminals connected to other external transmission lines. In addition, the illustrated switch network system 10 further comprises an external interface unit 5, a main control unit 6, a main processing unit 7, and a network data memory 8 all of which are operable in a manner similar to those illustrated in FIG. 1.

Like in FIG. 1, the internal connection data signals and the network connection data signals are stored in the internal data memories 4-1 to 4-n and the network data memory 8 as internal management data signals and network management data signals and are managed by the sub-control units 3-1 to 3-n and the main control unit 6, respectively.

Herein, it is to be noted that first through n-th switch-search and renewal units 9-1 to 9-n are included in the first through the n-th link stages of the switch network system 10 and are connected to a route-search and renewal processing unit 9 which is used in common to the first through the n-th link stages.

As readily understood from FIG. 2, the switch network system 10 is different from that illustrated in FIG. 1 in view of the fact that a combination of the switch-search and renewal units 9-1 to 9-n and the route-search and renewal processing unit 9 is included in FIG. 2 and is operable in a manner to be described later in detail when the interconnection data signals and the network connection data signals are lost or broken.

More specifically, the switch-search and renewal units 9-1 to 9-n are operable to regenerate or recover the interconnection data signals stored in the internal data memories 4-1 to 4-n, respectively, while the route-search and renewal processing unit 9 is operable to regenerate or recover the network connection data signals stored in the network data memory 8.

As mentioned in connection with FIG. 1, it is surmised that the switch matrices 1-1 to 1-n have input terminals and output terminals and each input terminal can be connected to each output terminal under control of the sub-processing units 2-1 to 2-n. Interconnections among switch matrices 1-1 to 1-n may be formed by a multi-stage structure proposed by Clos in The Bell System Technical Journal referenced in the preamble of the instant specification. In this case, the switch matrices 1-1 to 1-n are connected to one another through predetermined wiring patterns.

The switch matrices 1-1 to 1-n are formed by LSI (Large Scale Integration) devices each of which has cross-point switches and a switch controller. It is noted that each cross-point switch can be controlled by the switch controller and states of the cross-point switches can be monitored by the switch controller to be read out. The illustrated sub-processing units 2-1 to 2-n control the cross-point switches in the switch matrices 1-1 to 1-n to drive or release them under control of the interconnection data signals sent from the sub-control units 3-1 to 3-n.

The sub-control units 3-1 to 3-n are supplied from the main processing unit 7 with the interconnection data signals of the switch matrices 1-1 to 1-n. The sub-control units 3-1 to 3-n store the interconnection data signals into the internal data memories 4-1 to 4-n on one hand and send them back to the sub-processing units 2-1 to 2-n on the other hand. Furthermore, the sub-control units 3-1 to 3-n manage or monitor the interconnection data signals and drive the switch-search and renewal units 9-1 to 9-n when any disorder is detected or indicated in connection with the interconnection data signals, namely, the internal management data signals.

The external interface unit 5 is connected to the main control unit 6 and is also connected to the external transmission lines through the network input terminals.

In response to a connection request sent through the external interface unit 5 and one of the network input terminals, the main control unit 6 decides the switch matrices which form a connection path between the network input terminal and the network output terminal indicated by the network connection data signals. The network connection data signals are sent through the external interface unit 5 to the main control unit 6 and stored in the network data memory 8 as the network management data signals. Furthermore, the illustrated main control unit 6 manages or monitors the network management data signals and drives the route-search and renewal processing unit 9 on detection or reception of any disorder in the network management data signals.

Then, the main control unit 6 produces the network connection data signals indicative of connection conditions of the switch matrices 1-1 to 1-n and supplies them to the main processing unit 7. The main processing unit 7 processes the network connection data signals to calculate internal connection routes between the input and the output terminals of the switch matrices 1-1 to 1-n on the basis of the connection conditions represented by the network connection data signals and to determine the interconnection data signals for the switch matrices. The interconnection data signals thus determined are delivered to the sub-control units 3-1 to 3-n which correspond to selected ones of the switch matrices 1-1 to 1-n. n represents the network data memory 8.

The switch-search and renewal units 9-1 to 9-n which are connected to the respective switch matrices 1-1 to 1-n read the states of the cross point switches out of the switch matrices 1-1 to 1-n and detect actual internal connection routes of the switch matrices 1-1 to 1-n. Thereafter, the switch-search and renewal units 9-1 to 9-n obtain the actual interconnection data signals from the internal connection routes. The actual interconnection data signals are sent to the internal data memory 4-1 to 4-n and renew the interconnection data signals previously stored therein. Thus, the internal management data signals are reproduced in the internal data memories 4-1 to 4-n under control of the switch-search and renewal units 9-1 to 9-n.

The route-search and renewal processing unit 9 is driven when any disorder in the network management data signals is detected by the main control unit 6. Thereafter, the route-search and renewal processing unit 9 successively retrieves the network output terminals to search for the switch matrices which are connected to a selected one of the network input terminals. Thus, detection is made about the switch matrices which establish the connection paths between the selected network input terminal and a selected one of the network output terminals. Actual network connection data signals are formed by such connection states among the switch matrices and are substituted for the network connection data signals stored in the network data memory 8. Thus, the network management data signals are also renewed and reproduced from the network data memory 8.

Figure 3:
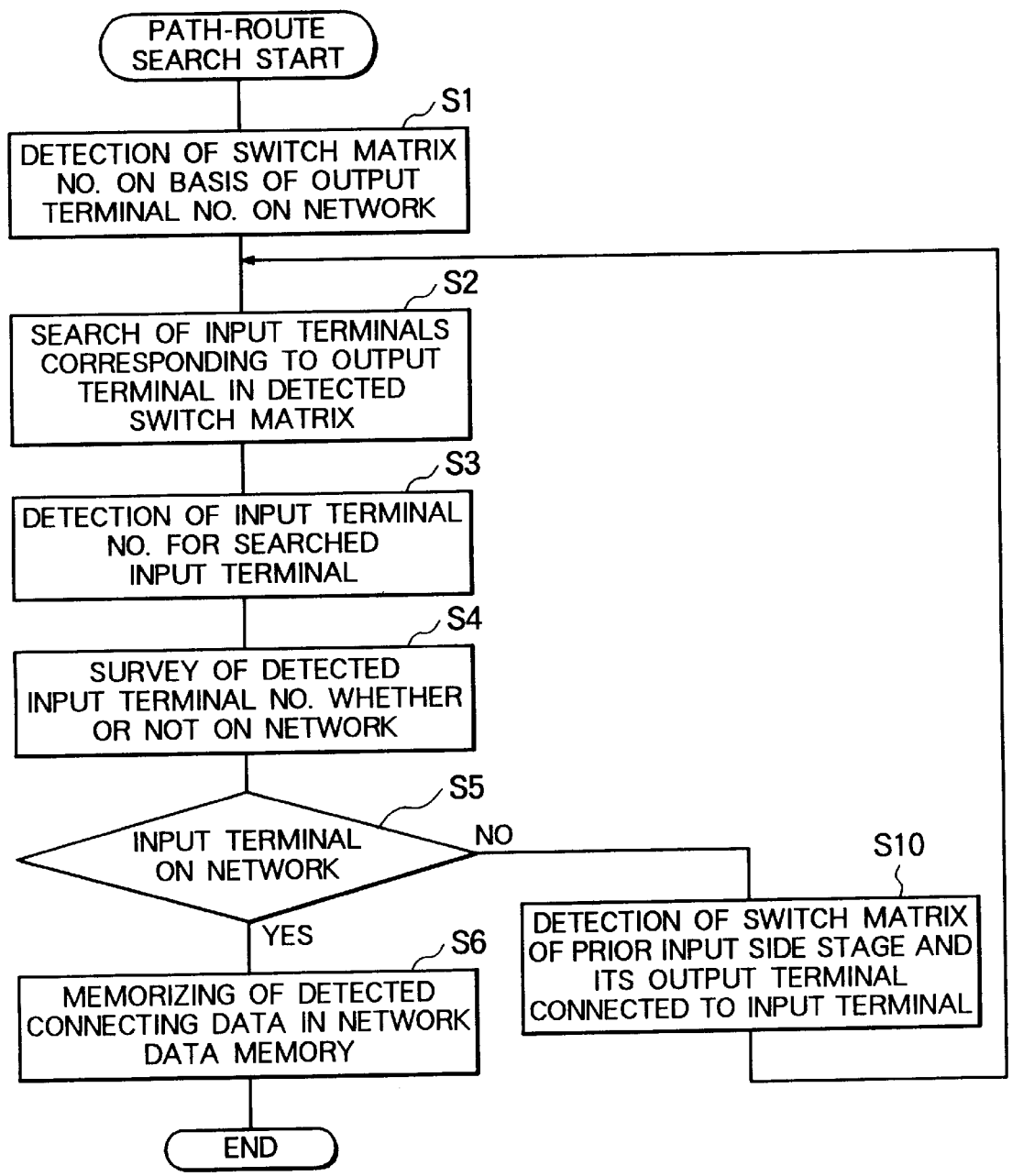
FIG. 3 is a flowchart for use in describing a main operation of a route-search and renewal processing unit illustrated in FIG. 2.

Referring to FIG. 3 in addition to FIG. 2, description will be made about a processing operation of the route-search and renewal processing unit 9.

In FIG. 3, the route-search and renewal processing unit 9 is driven in a first procedure and detects the switch matrix number from the network output terminal number designated to be retrieved and then detects the switch matrix 1-i which has that number (step S1).

In a second procedure, the route-search and renewal processing unit 9 actuates the sub-control unit 3-i which is selected from the sub-control units 3-1 to 3-n and which corresponds to the the detected switch matrix 1-i included in a selected one of the link-stages. The actuated sub-control unit 3-i searches for the input terminal which is connected to the designated output terminal through cross point switches in the switch matrix 1-i (step S2) and detects the input terminal and its terminal number assigned to the input terminal (step S3).

In the above mentioned steps S2 and S3, the sub-control unit 3-i searches for the internal data memory 4-i at first. In the case where the sub-control unit 3-i can not detect the input terminal under connection in the internal data memory 4-i, the sub-control unit 3-i actuates the switch-search and renewal unit 9-i. As a result, the internal connection management data signals which correspond to the connection in the internal data memory 4-i are regenerated and then the input terminal is again searched which is connected to the output terminal in question.

In a third procedure, the route-search and renewal processing unit 9 looks up the detected input terminal number (step S4) and judges whether or not the detected input terminal is one of the network input terminals (step S5).

At the step S5, "YES" is detected, the route-search and renewal processing unit 9 renders connection information of the detected connection path into the network connection data signals on the basis of connection data for the detected connection path and undates the network data memory 8 by the network connection data signals regenerated in the above-mentioned manner (step S6).

On the other hand, let "NO" be detected at the above-mentioned step S5 and, as a result, the detected input terminal be not present in the network input terminals. In this case, the input terminal detected at the third step S3 is connected to a previous one (1-(i-1)) of the switch matrices. Accordingly, the route-search and renewal processing unit 9 reads the wiring data predetermined among the switch matrices. The wiring data are fixed among the switch matrices from 1-1 to 1-n as mentioned above.

Then, the route-search and renewal processing unit 9 searches the output terminal of the switch matrix 1-(i-1) to be connected to the detected and designated input terminal of the switch matrix 1-i and detects the switch matrix number and the output terminal number (step S10). Thereafter, the procedure is returned back to the abovementioned step S2.

The above-mentioned process-steps are also applicable to a method of successively retrieving an input terminal from an output terminal to obtain a terminal number assigned to the input terminal, when any disorder is detected in a connection path.

When any disorder takes place in the network data memory 8, all connection routes which are being connected are retrieved on the side of the network output terminals. Specifically, the route-search and renewal processing unit 9 searches for a single one of the network output terminals and finishes searching when a next one of the network output terminals to be retrieved is not present. When the remaining network output terminals are present, operation is returned back to the above-mentioned step S1 so as to carry out the following retrieval.

Under the circumstances, the route-search and renewal processing unit 9 will be actuated by the main control unit 6, when any disorder is detected in the connection path and is detected in the network data memory 9. Furthermore, the route-search and renewal processing unit 9 may carry out an operation such that it is periodically driven or actuated to collect connection data signals through all output terminals under connection and to renew the connection data signals stored in the network data memory 8.

Although the sub-control units 3-1 to 3-n and the sub-processing units 2-1 to 2-n are shown by individual blocks in FIG. 2, each sub-control unit 3-1 to 3-n may be combined with each sub-processing unit 3-1 to 3-n. Likewise, the main control unit 6 and the main processing unit 7 which are shown by different blocks may be combined together.

Figure 4:
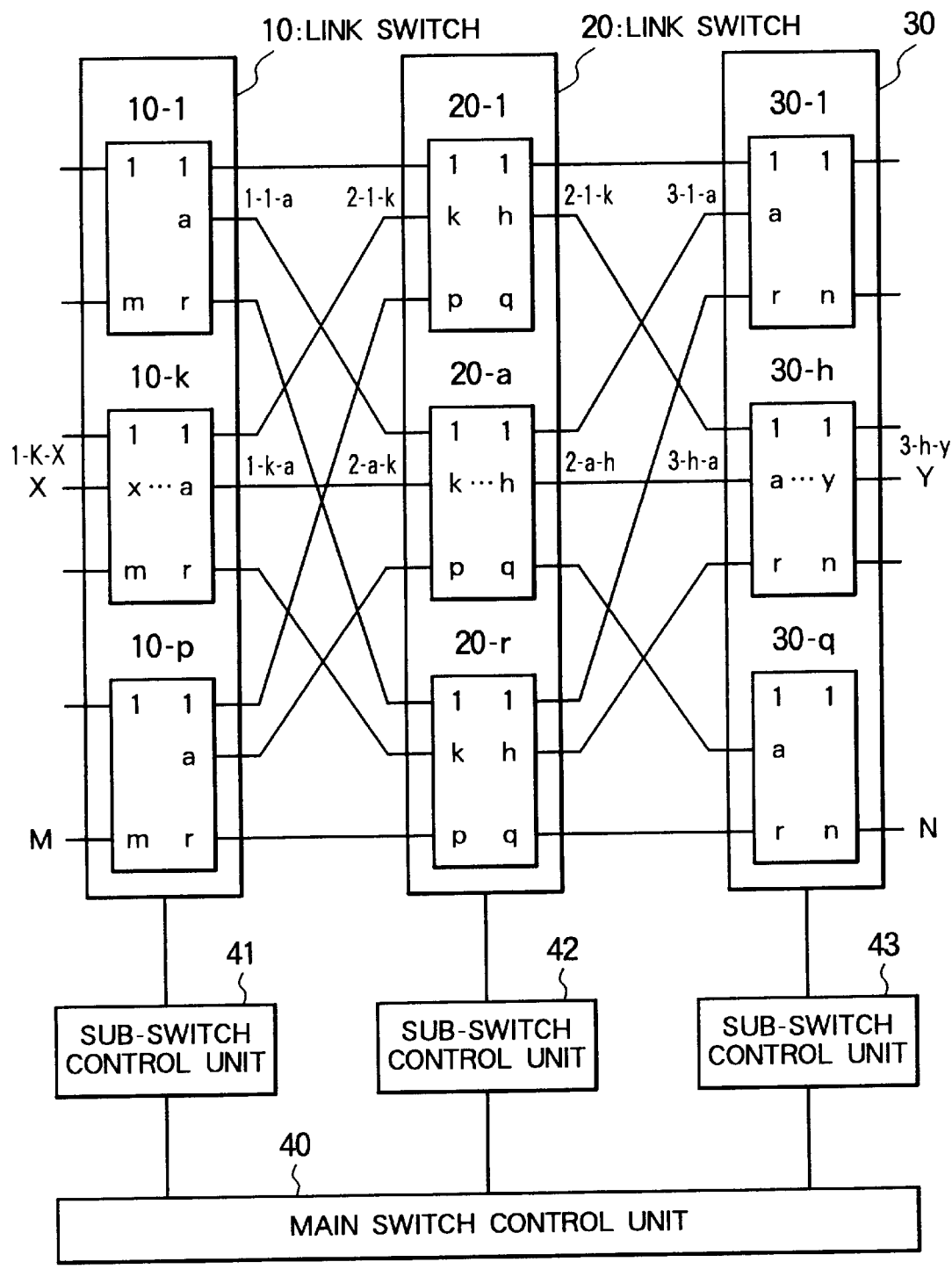
FIG. 4 is a block diagram of a switch network system according to a second embodiment of this invention.

Referring to FIG. 4, description will be made of a switch network system according to a second embodiment of this invention.

The illustrated switch network system is exemplified by first through third link switches 10, 20, and 30 of Clos types and has a plurality of network input terminals, M in number, and a plurality of network output terminals, N in number, where N and M are integers greater than unity and may be equal to each other. In this connection, the switch network system is operable as a switch network which has a switch size of N×M.

The first link switch 10 of the Clos type has switch matrices 10-1 to 10-p, p in number, each of which has input terminals, m in number, and output terminals, r in number, where each of p, m, and r is an integer. Herein, p is equal to M/m, as readily understood.

The second link switch 20 of the Clos type also has switch matrices 20-1 to 20-r, r in number, each of which has input terminals, p in number, and output terminals, q in number while the third link switch 30 of the Clos type has switch matrices 30-1 to 30-q, q in number, each of which has input terminals, r in number, and output terminals, n in number, where each of n and q is an integer. Herein, q is equal to N/n.

In the example, the first through the third link switches 10 to 30 are connected to first through third sub-switch control units 41 to 43 which have functions of both the sub-control units 3-1 to 3-n and the sub-processing units 2-1 to 2-n illustrated in FIG. 2 and which may be referred to as combinations of the sub-control units 3-1 to 3-n and the sub-processing units 2-1 to 2-n. The illustrated sub-switch control units 41, 42, and 43 are connected to a main switch control unit 40 which is substantially equivalent in operation to a combination of the main control unit 6 and the main processing unit 7 both of which are illustrated in FIG. 2. The main switch control unit 40 serves to determine a connection path in the switch network system, to designate the switch matrices to be connected and to the sub-switch control units 41 to 43 of the designated switch matrices.

Furthermore, connections between the link-switches are realized by non-blocking switch network wirings of the Clos type. Specifically, such connections are carried out between the switch matrices 10-1 to 10-p and switch matrices 20-1 to 20-r and between the switch matrices 20-1 to 20-r and switch matrices 30-1 to 30-q.

In the meanwhile, terminal numbers of the switch matrices are assumed to be formed by a combination of link switch numbers assigned to individual link switches, switch matrix numbers assigned to individual switch matrices, and sequence numbers assigned to the individual switch matrices. On the other hand, terminal numbers are also formed by combinations of the link switch numbers, destination sequence numbers in destination switch matrices, and destination switch matrix numbers.

With this structure, an a-th output terminal 1-k-a ($1 \leq a \leq r$) of the switch matrix 10-k ($1 \leq k \leq p$) is wired or connected to a k-th input terminal 2-a-k of the switch matrix 20-a. Likewise, an h-th output terminal 2-a-h ($1 \leq h \leq q$) of the switch matrix 20-a is wired or connected to an a-th input terminal 3-h-a of the switch matrix 30-h.

A procedure of retrieving a connection path in connection with the above-mentioned switch network system illustrated in FIG. 4 is now described.

Herein, a connection path between the network input terminal X and the network output terminal Y both of which are illustrated in FIG. 4 will be assumed to be exemplified. The illustrated network input terminal X is an x-th input terminal 1-k-x of the switch matrix 10-k ($1 \leq x \leq m$) while the output terminal Y is a y-th output terminal 3-h-y of the switch matrix 30-h ($1 \leq y \leq n$).

In the illustrated example, the connection path between the network input terminal X and the network output terminal Y is established by a fixed connection which passes through the first through the third link switches 10 to 30 and which is formed in the following manner. Namely, the x-th input terminal 1-k-x is connected to an a-th output terminal 1-k-a in the switch matrix 10-k of the first link switch 10 while the k-th input terminal 2-a-k is connected to the h-th output terminal 2-a-h in the switch matrix 20-a of the second link switch 20. Furthermore, the a-th input terminal 3-h-a is connected to the y-th output-terminal 3-h-y in the switch matrix 30-h of the third link switch 30. Thus, the fixed connection forms the connection path between the network input terminal X and the network output terminal Y through the link switches 10, 20, and 30.

Referring to FIG. 4, description will be made about an operation of searching or retrieving a path under connection. Such operation will be made by the above-mentioned route-search and renewal processing unit, although the unit in question is omitted from FIG. 4.

At first, when the network output terminal Y is the y-th output terminal 3-h-y in the switch matrix 30-h, the route-search and renewal processing unit reads the connecting situation of the crosspoint of the switch matrix 30-h and detects the input terminal 3-h-a to be connected to the output terminal 3-h-y in the switch matrix 30-h. At the next step, the route-search and renewal processing unit detects the output terminal 2-a-h of the switch matrix 20-a connected through the fixed wiring from the input terminal number 3-h-a of the switch matrix 30-h.

Then, the route-search and renewal processing unit detects the input terminal 2-a-k connected to the output terminal 2-a-h within the switch matrix 20-a in a similar manner to that mentioned above. In a like manner, the output terminal 1-k-a of the switch matrix 10-k is obtained with reference to the input terminal number 2-a-k and is fixedly determined.

Finally, the input terminal 1-k-x connected to the output terminal 1-k-a within the switch matrix 10-k is detected by the route-search and renewal processing unit in a similar manner.

Figure 5:
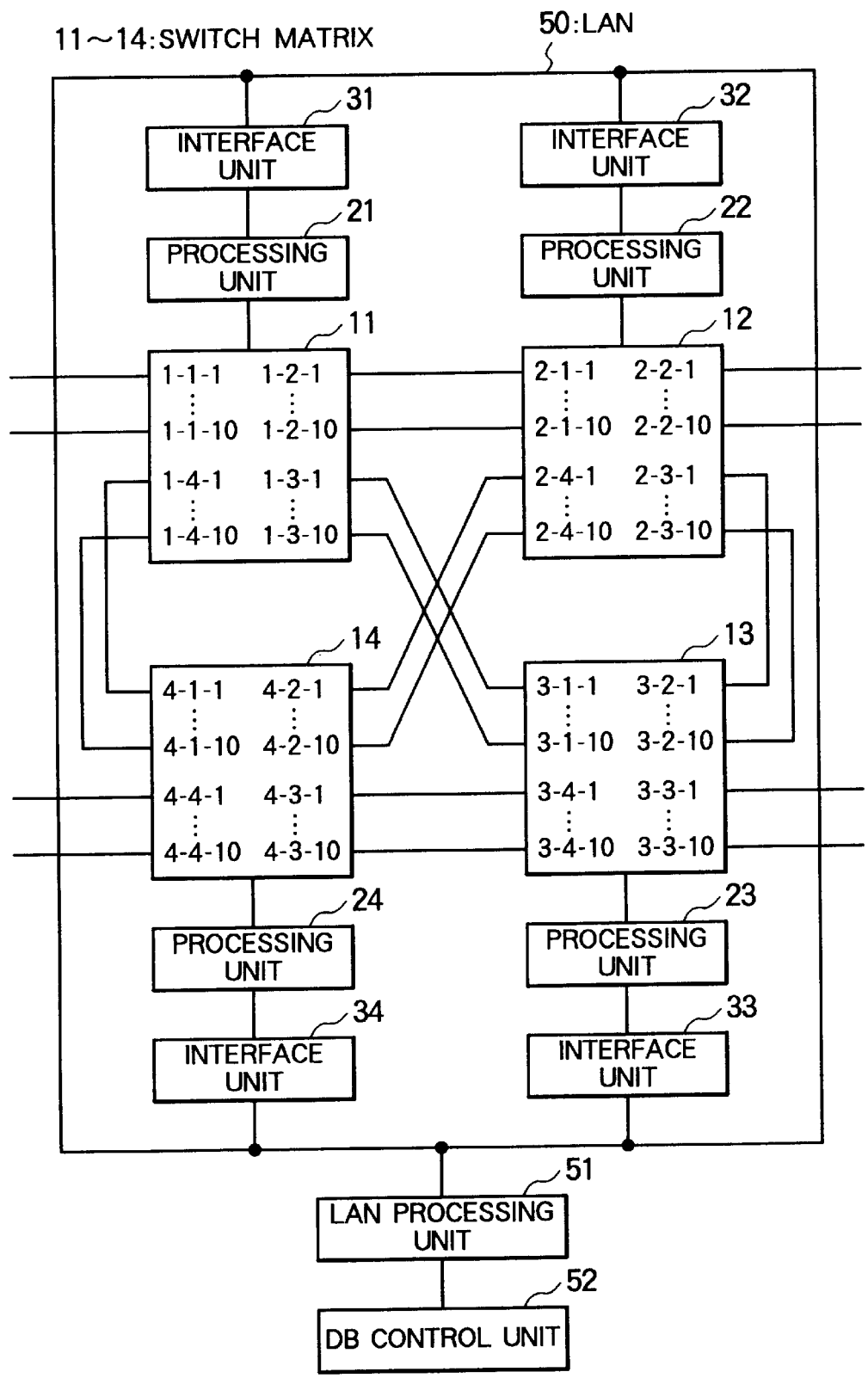
FIG. 5 is a block diagram of a switch network system according to a third embodiment of this invention.

Referring to FIG. 5, description will be made as regards a switch network system according to a third embodiment of this invention.

In this example, the description will be made on the assumption that the switch network system comprises four link-stages and is connected to a WS (Work Station) through a LAN (Local Area Network) 50. In this event, the WS is assumed to be operable as a network management system. The link-stages comprise switch matrices 11 to 14, processing units 21 to 24, and interface units 31 to 34 and are connected through the LAN 50 to the WS which is specified by an LAN processing unit 51 and a DB (Data Base) control unit 52.

Each of the processing units 21 to 24 has an internal data memory and a processing unit and is operable to connect each of the switch matrices to the corresponding interface devices 31 to 34. The interfaces 31 to 34 are operable to connect the processing units to the LAN 50.

Herein, it is assumed that the illustrated switch network system forms a bidirectional switch network system. In this connection, each terminal of the switch matrices 11 to 14 is operable as either an input terminal or an output terminal and is therefore referred to as an input/output terminal in the following description as long as consideration is made about no direction of communication. Taking this into account, each input/output terminal number assigned to each input/output terminal of the switch matrices is formed by an combination of a individual link stage number, a destination switch matrix number to be connected, and a sequence number assigned to each of the switch terminals in the individual link stage. It may be considered that each input/output terminal which has the destination switch matrix number identical with its own switch matrix number serves as a network input/output terminal.

The first through the fourth matrices 11 to 14 are mutually connected to one another through wirings as shown in FIG. 5.

More particularly, the switch matrices 11 and 12 are mutually connected or wired to each other through wirings or connection lines between the input/output terminals 1-2-1 to 1-2-10 of the switch matrix 11 and the input/output terminals 2-1-1 to 2-1-10 of the switch matrix 12.

Likewise, the switch matrices 11 and 13 are mutually connected to each other through wirings or connection lines between the input/output terminals 1-3-1 to 1-3-10 of the switch matrix 11 and the input/output terminals 3-1-1 to 3-1-10 of the switch matrix 13. Similarly, the switch matrices 11 and 14 are mutually connected to each other through connection lines between the input/output terminals 1-4-1 to 1-4-10 of the switch matrix 11 and the terminals 4-1-1 to 4-1-10 of the switch matrix 14.

In addition, the switch matrices 12 and 13 are mutually connected to each other through connection lines between the input/output terminals 2-3-1 to 2-3-10 of the switch matrix 12 and the input/output terminals 3-2-1 to 3-2-10 of the switch matrix 13. Similarly, the switch matrices 12 and 14 are mutually connected to each other through connection lines between the input/output terminals 2-4-1 to 2-4-10 of the switch matrix 12 and the terminals 4-2-1 to 4-2-10 of the switch matrix 14. Moreover, the switch matrices 13 and 14 are mutually connected to each other through connection lines between the input/output terminals 3-4-1 to 3-4-10 of the switch matrix 13 and the terminals 4-3-1 to 4-3-10 of the switch matrix 14, respectively.

The other input/output terminals 1-1-1 to 1-1-10; 2-2-1 to 2-2-10; 3-3-1 to 3-3-10; and 4-4-1 to 4-4-10, are connected to external transmission lines extended from the switch network system.

The LAN processing unit 51 is connected to the LAN 50 through an interface included in the LAN processing unit 51 and is connected to the data base (DB) control unit 52. The DB control unit 52 controls the data base of the WS.

Next, the route-search and renewal processing unit (FIG. 2) is operable in a manner to be described later in detail, although it is omitted from FIG. 5. Herein, operations of the route-search and renewal processing unit will be described as first and second examples.

In the first example, it is assumed that the input/output terminal 1-1-1 is connected to the input/output terminal 3-3-3 through a first path between the input/output terminal 1-1-1 and the input/output terminal 1-2-2 in the switch matrix 11, a second path between the input/output terminals 2-1-2 and the input/output terminals 2-3-2 in the switch matrix 12, and a third path between the input/output terminals 3-2-2 and the input/output terminals 3-3-3 in the switch matrix 13. Herein, let unidirection communication be carried out from the input/output terminal 3-3-3 to the input/output terminal 1-1-1. In this event, the input/output terminal 1-1-1 serves as an output terminal while the input/output terminal 3-3-3 serves as an input terminal.

Under the circumstances, the retrieval or search operation is assumed to be made from the output terminal 1-1-1 by the route-search and renewal processing unit. In this case, the route-search and renewal processing unit at first detects that the first path is formed between the output terminal 1-1-1 of the switch matrix 11 and the input terminal 1-2-2 on the basis of the connecting situation of the switch matrix 11. The route-search and renewal processing unit is previously notified that the detected input terminal 1-2-2 is connected to the output terminal 2-1-2 by the connection lines between the switch matrices 11 and 12.

Subsequently, the route-search and renewal processing unit detects that the second path is formed in the switch matrix 12 between the output terminal 2-1-2 and the input terminal 2-3-2 from the connecting situation of the switch matrix 12. In addition, the route-search and renewal processing unit is previously notified that the detected input terminal 2-3-2 is connected to the output terminal 3-2-2 by the connection lines between the switch matrices 12 and 13.

Thereafter, the route-search and renewal processing unit detects that the third path is formed in the switch matrix 13 between the output terminal 3-2-2 and input terminal 3-3-3 with reference to the connecting situation of the switch matrix 13. The route-search and renewal processing unit is previously notified that the detected input terminal 3-3-3 is operable as the network input terminal. Under the circumstances, the route-search and renewal processing unit can detect a connection state between the output terminal 1-1-1 and the input terminal 3-3-3.

Alternatively a search or retrieval operation can be carried out from the output terminal 3-3-3. In this case, the route-search and renewal processing unit detects that the third path is formed between the output terminal 3-3-3 and the input terminal 3-2-2 in the switch matrix 13 with reference to the connecting situation of the switch matrix 13. The route-search and renewal processing unit is notified in advance that the detected input terminal 3-2-2 is connected to the output terminal 2-2-2 through the connection lines between the switch matrices 13 and 12.

Subsequently, the route-search and renewal processing unit detects that the second path is formed between the output terminal 2-2-2 and the input terminal 2-1-2 in the switch matrix 12 with reference to the connecting situation of the switch matrix 12. In addition, the route-search and renewal processing unit is previously notified that the detected input terminal 2-1-2 is connected to the output terminal 1-2-2 through the connection lines between the switch matrices 12 and 11.

Thereafter, the route-search and renewal processing unit detects that the first path is formed in the switch matrix 11 between the output terminal 1-2-2 and the input terminal 1-1-1 on the basis of the connecting situation of the switch matrix 11. As mentioned before, the detected input terminal 1-1-1 is connected to the external transmission line. Thus, the route-search and renewal processing unit is able to know the connecting situation between the output terminal 3-3-3 and the input terminal 1-1-1 within the switch network system.

As a second example, it is assumed that the input/output terminal 1-1-6 is connected to the input/output terminal 3-3-7 through a first path between the input/output terminal 1-1-6 and the input/output terminal 1-3-1 in the switch matrix 11 and a second path between the input/output terminal 3-1-1 and the input/output terminal 3-3-7 in the switch matrix 13. In this event, it is assumed that the input/output terminal 1-1-6 serves as an output terminal while the input/output terminal 3-3-7 serves as an input terminal.

Herein, let the search or retrieval operation be at first carried out from the output terminal 1-1-6. In this event, the route-search and renewal processing unit detects on the basis of the connecting situation of the switch matrix 11 that the first path is formed between the output terminal 1-1-6 and the input terminal 1-3-1 in the switch matrix 11. The route-search and renewal processing unit is previously notified that the detected input terminal 3-1-1 is connected to the output terminal 1-3-1 through the connection lines between the switch matrices 13 and 11.

Thereafter, the route-search and renewal processing unit detects on the basis of the connecting situation of the switch matrix 13 that the second path is formed between the output terminal 3-1-1 and the input terminal 3-3-7. Thus, the detected input terminal 3-3-7 is connected to the external transmission line. In this state, the route-search and renewal processing unit is notified that the output terminal 1-1-6 is connected to the input terminal 3-3-7 in the illustrated switch network system.

On the other hand, it is assumed that the input/output terminal 3-3-7 serves as an output terminal while the input/output terminal 1-1-6 serves as an input terminal. In this event, let the search or retrieval operation be carried out from the output terminal 3-3-7. The route-search and renewal processing unit detects that the second path is formed in the switch matrix 13 between the output terminal 3-3-7 and the input terminal 3-1-1. The route-search and renewal processing unit is previously notified that the detected input terminal 3-1-1 is connected to the output terminal 1-3-1 by the connection lines between the switch matrices 13 and 11.

As mentioned before, the route-search and renewal processing unit detects that the connecting path is formed in the switch matrix 11 between the output terminal 1-3-1 and input terminal 1-1-6 on the basis of the connecting situation of the switch matrix 11. As the detected input terminal 1-1-6 is connected to the external transmission line and serves as the network input terminal, the route-search and renewal processing unit can detect the connecting situation between the output terminal 3-3-7 and the input terminal 1-1-6 in the switch network system.

While this invention has thus far been described in conjunction with a few embodiments thereof, it will be readily possible for those skilled in the art to put this invention into practice in various other manners. For example, a wide variety of switch matrices may be used instead of the switch matrices of the Clos types.

What is claimed is:

1. A method of forming a connection path through a switch matrix which has a plurality of input terminals and a plurality of output terminals by the use of interconnection data signals which define the connection path within the switch matrix, the method comprising the steps of:

connecting a selected one of the input terminals to a selected one of the output terminals through the switch matrix by the use of the connection data signals;

monitoring a connection state of the switch matrix;

obtaining actual interconnection data signals from the connection state of the switch matrix; and substituting the actual interconnection data signals for the connection data signals when any disorder takes place in connection with the connection data signals.

2. A switch network system for use in forming a connection path through a switch matrix which has a plurality of input terminals and a plurality of output terminals by the use of interconnection data signals which define the connection path between a selected one of the input terminals within said switch matrix and a selected one of the output terminals, said switch network system comprising:

controlling means for controlling the switch matrix to connect a selected one of the input terminals to a selected one of the output terminals through the switch matrix by putting the switch matrix into a connection state;

monitoring means for monitoring the switch matrix to extract actual interconnection data signals from the connection state; and renewing means for renewing the interconnection data signals into the actual interconnection data signals when any disorder takes place in connection with the interconnection data signals.

3. A switch network system which has a plurality of network input terminals and a plurality of output terminals and which comprises a plurality of switch link stages each of which has a switch matrix and which is successively connected to one another between the plurality of the network input terminals and the plurality of the network output terminals, said switch matrix in each of the switch link stages comprising a plurality of input terminals and a plurality of output terminals, said switch network system comprising:

main control means for managing network connection data signals which define a connection path between the network input terminals and the network output terminals;

sub-control means, which is coupled to said main control means, for producing interconnection data signals in response to said network data signals to control the switch matrix of each switch link stage and to connect a selected one of the input terminals to a selected one of the output terminals through the switch matrix by putting the switch matrix into a connection state;

disorder determination means for determining when disorder takes place in connection with the interconnection data signals within said switch matrix; and reproducing processing means, which is coupled to said switch matrix of each switch link state and the sub-control means of each switch link stage, for reproducing the network connection data signals when any disorder takes place as determined by the disorder determination means.

4. A switch network system as claimed in claim 3, wherein said reproducing processing means comprises:

detecting means for detecting the number of the switch matrix and the output terminals of each switch link stage from the network connection data signals;

retrieving means for retrieving the input terminals from the output terminals detected in connection with each switch link stage to detect input terminal numbers assigned to the input terminals and to define the network connection data signals with reference to the detected output terminals and the input terminal numbers; and memorizing means for memorizing the network connection data signals to be reproduced.

5. A switch network system as claimed in 4, wherein said memorizing means memorizes the interconnection data signals together with the network connection data signals;

said first through n-th link-stages comprising first through n-th switch-matrixes, first through n-th sub-control unit, first through n-th internal data memories, respectively.

6. A connecting data control system for use in a switch network which has input terminals and output terminals, first through n-th link-stages, a main control unit, and a network data memory, where n represents an integer greater than one;

said first through n-th link-stages comprising first through n-th switch matrices, first through n-th internal data memories, first through n-th sub-control unit, and first through n-th switch-search and renewal units, respectively;

said main control unit controlling said network data memory and said switch network;

said network data memory for memorizing network input/output control data together with connection data between input-terminals and output-terminals on said switch network;

said first through n-th switch matrices having input terminals and output terminals;

said first through n-th sub-control unit controlling said internal data memory and said link-stage under control of said switch-search and renewal processing unit;

said first through n-th internal data memories for memorizing internal input/output control data signals together with connection data signals between input-terminals and output-terminals in said switch-matrices, respectively;

said first through n-th switch-search and renewal units renewing data signals kept in said internal data memories by obtaining the connection data signals which are detected by searching connecting paths to be established one after another in each of the switch matrices.

7. A connecting data control system claimed in claim 6, wherein the renewing of each of the first through n-th switch-search and renewal units is carried out from a predetermined output-terminal at predetermined time.

* * * * *